United States Patent Office 2,829,085
Patented Apr. 1, 1958

2,829,085

PARENTERAL VEHICLE FOR THERAPEUTIC AGENTS

Clifford F. Gerber, New Hyde Park, William W. Armstrong, Oyster Bay, and Michael J. Marmo, Brooklyn, N. Y., assignors to Chas. Pfizer & Co., Inc., Brooklyn, N. Y., a corporation of Delaware No Drawing. Application June 21, 1955
Serial No. 517,078

2 Claims. (Cl. 167—58)

This invention is concerned with a novel medium for the suspension of therapeutic agents. It is particularly concerned with obtaining water insoluble therapeutic agents in a form suitable for injection.

Many valuble therapeutic agents, for example many steroids and antibiotics are water insoluble. This insolubility presents a difficult problem when an attempt is made to inject the substance. The substance must, in some way, be in a dispersed form, but the dispersing medium must not be such as to cause irritation at the site of injection.

Previous attempts to solve this problem have centered around the use of such materials as gums, acacia, pectin or methyl cellulose, which, when added to water, will produce a mixture of such high viscosity that the sedimentation of the insoluble therapeutic agent therein will be retarded. There are, however, several disadvantages to this method. Sedimentation, at best, is only temporarily retarded, and often does occur to a greater or lesser degree. Uncertainty of dosage is one obvious untoward result. There are also present the additional disadvantages which result from the use of mediums of such high viscosity. These disadvantages include difficulty in handling, resistance to flow through the needle, and problems of sterilizing equipment which has become sticky.

These and other difficulties are obviated by our present invention. It has been found that water insoluble therapeutic agents may be obtained in the form of injectable aqueous suspensions by dissolving in water a substance which will give with the water a solution having a specific gravity substantially equal to that of the therapeutic agent to be suspended. This is an unexpected result, since it was to be expected that solutions having a concentration sufficiently high to give the requisite specific gravity would be too irritating for injection purposes. It has, however, been found that certain polyhydroxylated compounds, for example sorbitol, can be added to water to give a solution which has a high enough specific gravity to suspend a water insoluble therapeutic agent, for example a steroid, such as progesterone or an antibiotic such as procaine penicillin, and which will not cause irritation at the point of injection. Furthermore, the mixture has the additional advantage of viscosity much lower than that of mixtures which depend upon their viscosity to produce suspension.

It is desirable that the specific gravity of the suspending solution be very close to that of the suspended therapeutic agent. For example, the specific gravity of progesterone is 1.163. To produce optimum suspension, it is preferred that the specific gravity of the solution should differ from that of the progesterone by less than about ±0.004. To obtain a solution of this specific gravity, about 30 grams of sorbitol must be dissolved in 100 ml. of water.

The specific gravity of esterone is about 1.23. To obtain a solution of this specific gravity, about 50 grams of sorbitol must be dissolved in 100 ml. of water. Despite the high concentration and osmotic pressure of such a solution, it may be injected without causing irritation or inflammation at the site of injection.

It was to be expected that since the specific gravity of the suspending medium and that of the suspended therapeutic agent should be quite close together, the mixture would be very sensitive to minute changes in temperature. It has, however, been found that the suspensions may be heated from room temperature to 50° C. in closed containers without sedimentation taking place.

An additional advantage of this invention is that it permits the use of therapeutic agents, steroids or antibiotics for example, in the form of particles larger than those previously employed. This larger particle size results in longer activity from a single injection.

Although sorbitol is preferred, other polyhydroxylated compounds may also be used. These include sucrose and levulose. Saturated solutions of maltose, galactose, sorbose and dextrose may also be used to suspend some of the less dense therapeutic materials such as progesterone and testosterone.

The following examples are given solely for the purpose of illustration and are not to be construed as limitations of this invention, many variations of which are possible without departing from the spirit or scope thereof.

Example I

The following mixture was injected into a patient with good results. The composition is expressed in the units mg./ml.

| | |
|---|---:|
| Progesterone | 50 |
| Sorbitol | 354 |
| Polysorbate 80 (U. S. P.) | 4 |
| Benzyl alcohol | 9 |
| Water | 746 |
| | 1,163 |

The progesterone, polysorbate 80 and a portion of the benzyl alcohol were milled as a concentrate in water for 48 hours in a ball mill jar with ½ inch porcelain balls. After milling the concentrate suspension was diluted with aqueous sorbitol solution containing benzyl alcohol to give the concentrations stated above. The sorbitol concentration is such as to give a specific gravity of 1.163, equal to that of progesterone.

Example II

The following mixture was injected into patient with good results. The composition is expressed in the units mg./ml.

| | |
|---|---:|
| Hydrocortisone acetate | 25 |
| Sorbitol | 744 |
| Polysorbate 80 (U. S. P.) | 4 |
| Benzyl alcohol | 9 |
| Water | 475 |
| | 1,257 |

The hydrocortisone acetate, polysorbate 80 and a portion of the benzyl alcohol were milled as a concentrate in water for 48 hours in a ball mill jar with ½ inch porcelain balls. After milling the concentrate suspension was diluted with aqueous sorbitol solution containing benzyl alcohol to give the concentrations stated above. The sorbitol concentration is such as to give a specific gravity of 1.257, equal to that of hydrocortisone acetate.

What is claimed is:

1. An injectable composition of matter comprising a water insoluble, therapeutically active steroid, water and a sufficient amount of a polyhydroxylated compound selected from the group consisting of sorbitol, sucrose, levulose, maltose, galactose, sorbose and dextrose to give with the water a solution having a specific gravity within about ±0.004 of the specific gravity of said steroid.

2. An injectable composition of matter comprising a water insoluble therapeutically active steroid, water and sufficient sorbitol to give with the water a solution having a specific gravity of within about ±0.004 of the specific gravity of the steroid.

References Cited in the file of this patent

UNITED STATES PATENTS

| 2,061,544 | Bockmuhl | Nov. 24, 1936 |
| 2,727,665 | Charney | Dec. 20, 1955 |

OTHER REFERENCES

Sorbitol, November 1947, pp. 6 and 17.

Gwathmey: Anesthesia, 1924, The MacMillan Co., New York, N. Y., p. 599.